United States Patent [19]

Hupee

[11] Patent Number: 4,653,722
[45] Date of Patent: Mar. 31, 1987

[54] FAUCET VALVE

[76] Inventor: Robert Hupee, 1910 Thierry Street, Brossard, Canada, J4W 2M8

[21] Appl. No.: 814,121

[22] Filed: Dec. 18, 1985

Related U.S. Application Data

[62] Division of Ser. No. 595,656, Apr. 2, 1984, Pat. No. 4,605,200.

[51] Int. Cl.⁴ ........................................... F16K 31/524
[52] U.S. Cl. .................... 251/260; 251/261; 251/298
[58] Field of Search ............... 251/257, 258, 262, 261, 251/298, 260; 137/523

[56] References Cited

U.S. PATENT DOCUMENTS 1,187,245  6/1916  Bjerke ........................... 251/258 X
1,509,862  9/1924  Edick ............................ 251/258 X
2,886,065  5/1959  Hershman ...................... 251/258 X
3,163,394  12/1964 Downin .......................... 251/258 X
3,265,373  8/1966  Walker et al. .................. 251/257 X

FOREIGN PATENT DOCUMENTS 622016  6/1961  Italy ..................................... 251/900

Primary Examiner—Martin P. Schwadron
Assistant Examiner—Stephen M. Hepperle

[57] ABSTRACT

A shut-off valve to fit the outlet end of a double faucet single spout tap in lieu of the conventional aerator screen. The valve comprises a valve body having an upstream valve seat on which is adapted to rest a disc-shape valve plug. An operant shaft extends transversely through the valve body and is provided with a handle at one end to rotate the shaft. The shaft has a central cam lapping a downstream edge portion of the valve plug. In one rotated position of the shaft, the valve plug closes the valve under the action of the upstream fluid pressure. Rotation of the shaft causes tipping of the valve plug to a fully-open position.

1 Claim, 7 Drawing Figures

U.S. Patent
Mar. 31, 1987
4,653,722
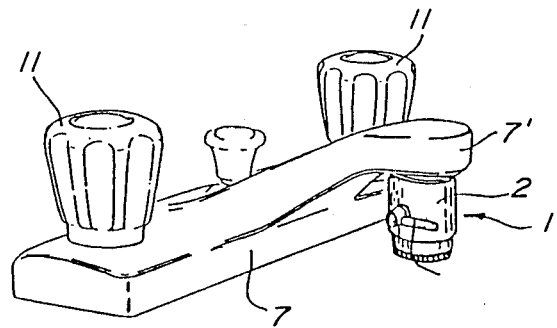
Fig. 1
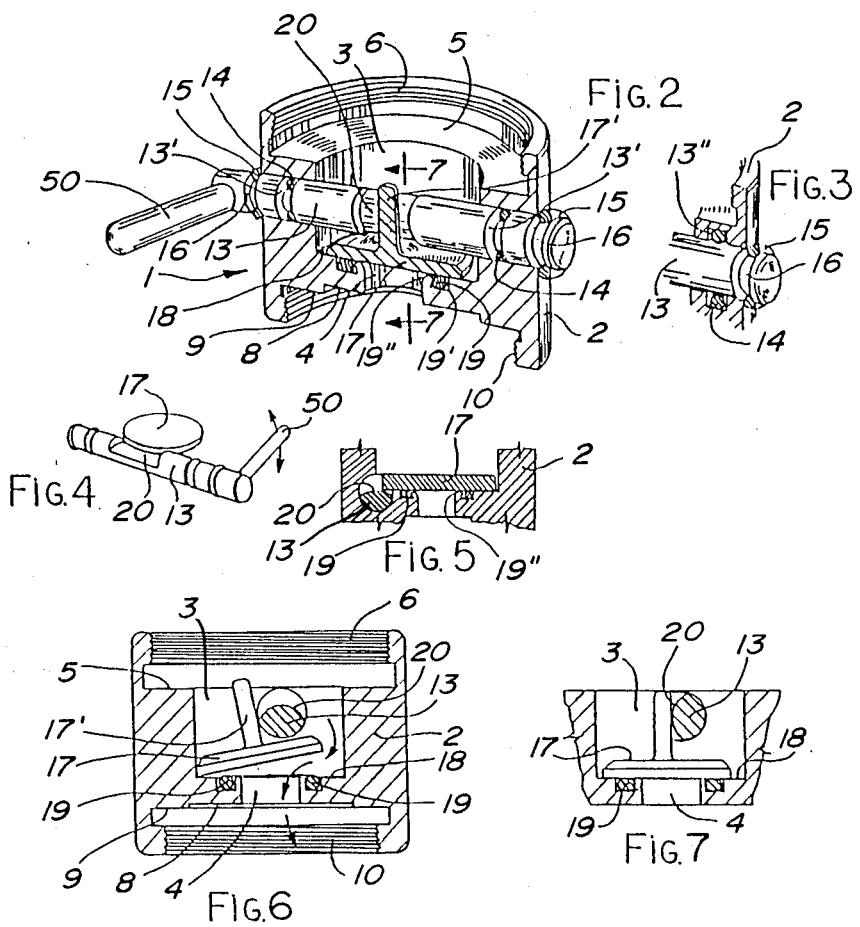

FAUCET VALVE

The present application is a divisional application of patent application Ser. No. 595,656, filed Apr. 2, 1984 and allowed Aug. 14, 1985 for a "Faucet Valve" (now U.S. Pat. No. 4,605,200 dated Aug. 12, 1986)

FIELD OF THE INVENTION

This invention relates to valve means for opening, closing and regulating the flow of liquids through conduits, specifically to a valve of novel construction adapted to such purpose.

BACKGROUND OF THE INVENTION

In homes as well as in certain industrial applications, a single tap outlet is used to dispense liquids from two or more faucets which are most often manually controlled. The most common tap outlet used is the one for cold and hot water installed over a sink in kitchens, washrooms, etc.

The drawback of single tap outlets is that the faucets have to be adjustably opened and shut each time the tap is needed. For some people, this can be a nuisance resulting in impatient adjustment of the faucets and, consequently, a flow of water which is, for example, in a kitchen excessive and/or too hot or too cold. In industrial uses of such taps, a worker may have a similar reaction again resulting in a liquid flow which does not correspond to the operational requirement and which wastes liquid.

OBJECTS OF THE INVENTION

Accordingly, it is the main object of the present invention to provide a shut-off valve which can be easily secured to the tap outlet of a tap connected to at least two faucets and which is adapted to instantly shut off or open the combined flow of liquid from the two faucets without having to adjust the faucets for each use of the tap.

It is another object of the invention to provide a shut-off valve which is long-lasting, sturdy and of extremely simple design.

SUMMARY OF THE INVENTION

The invention comprises a unitary valve body, of tubular shape adapted to be vertically disposed, having an upper, larger upstream lengthwise bore and a lower, smaller downstream bore communicating with the upstream bore and co-axial therewith. The annular step defined by the meeting of the two bores constitutes a valve seat which faces upstream and upwardly.

A non perforated disc-shaped valve plug movably and slidably rests on the valve seat. An "O" ring is provided in the valve seat to ensure that no liquid will flow past the valve plug when the latter is in fully closed position. The valve plug is not connected to any other element and freely, sealingly lies on the "O" ring solely by upstream liquid pressure acting on its upstream face.

An operant shaft extends through and is rotatably mounted in said valve body, parallel to the plane of the valve tangent to the valve plug and externally of the "O" ring. A handle is fixed to one end of the shaft to rotate the same. The central portion of the operant shaft is notched to form a radially-recessed cam surface extending across the shaft and merging with the full radius surface of said shaft. The cam surface is generally parallel to and not higher than the underface of the plug and laps the edge portion of said underface when the valve plug is in closed position under upstream liquid pressure. When the operant shaft is rotated, the cam surface progressively tips the valve plug angularly of the valve seat to a maximum opening position in which the full radius surface of said shaft is in contact with said underface edge portion. Seal means are provided between the shaft and the valve body. Preferably, the shaft is axially removable from the valve body.

BRIEF DESCRIPTION OF THE DRAWINGS

FIG. 1 is a perspective view of the shut-off valve of the invention installed at the common spout of a dual faucet assembly;

FIG. 2 is a lengthwise cross-sectional projectional view of an embodiment of the valve in accordance with the above-noted patent and showing the valve plug in closed position, this figure being for explanatory purpose;

FIG. 3 is a fragmentary view of the right-side portion of the operant shaft of FIG. 2, showing an alternate operant shaft seal;

FIG. 4 is a perspective view of the operant shaft and valve plug in accordance with the embodiment of the present invention;

FIG. 5 is a cross-sectional elevation of the operant shaft and valve plug of FIG. 4 in place in the valve body;

FIG. 6 is a cross-sectional elevation of the embodiment of FIG. 2 showing the valve plug in open position; and FIG. 7 is a partial cross-sectional view taken along line 7—7 of FIG. 2, showing the valve plug in closed position.

DETAILED DESCRIPTION OF THE INVENTION

Referring firstly to FIGS. 1, 2, 3, 6, and 7, there is shown, for explanatory purpose, an embodiment of the shut-off valve in accordance with the above-noted patent.

Valve 1 is comprised of a valve body 2, which is of a tubular shape and has a large upstream bore 3 formed lengthwise therein and a smaller downstream bore 4 communicating centrally with large bore 3. The upstream end portion of bore 3 widens up at 5 and is provided thereat with an internally-threaded annular flange 6, of a diameter suitable for attachment to the spout 7' of a tap 7. Normally, the external threading of spout 7' is intended for the attachment of an aerator screen (not shown) according to normal practice. The downstream end portion of valve body 2 also preferably widens successively at 8 and 9 and another annular flange 10 is provided thereat.

Flange 10 can be internally or externally threaded to receive an aerator screen, or the like.

Referring now to FIG. 2, there is shown an operant cylindrical shaft 13, which extends crosswise through large bore 3 and which is rotatably journalled within valve body 2 at both ends. Shaft sealing means, to prevent escape of fluid around shaft 13, are provided, consisting of an "O" ring seal 14 in a cross-sectionally square circumferential groove 13' made in both end portions of shaft 13.

FIG. 3 shows another embodiment of the sealing means, differing in that the circumferential groove 13" is made in both end portions of body 2. Shaft 13 is removably held in position by a pair of snap rings or "O" rings 15 engaged in corresponding circumferential grooves 16 located immediately exteriorly of valve body 2. One end of shaft 13 is provided with a transverse handle 50 to rotate shaft 13.

A valve plug 17 is freely disposed within large bore 3, having the form of a flat, non-perforated disc. In closed position, plug 17 rests on a valve seat 18 defined by the annular step between bore 3 and bore 4. Sealing means eliminate leakage of the valve when plug 17 is in closed position, consisting of another "O" ring seal 19 located in a circular groove 19' formed in valve seat 18 radially outwardly of downstream bore 4, thereby defining a deformable lip 19" between groove 19' and bore 4. As shown in FIGS. 2 and 5, the lip 19" of circular groove 19' is punched in over the "O" ring 19 to mechanically retain the latter within groove 19'. Plug 17 further includes an upstream projecting axial pin 17'. The central portion of shaft 13 has a radially-recessed cam surface 20, as shown in FIGS. 2, 6, and 7, which extends over slightly more than half the shaft circumference.

As clearly seen in FIGS. 6 and 7, operant shaft 13 is offset from the longitudinal axis of bore 3 and extends parallel to the plane of valve seat 18, such that cam surface 20 extends adjacent to axial pin 17'. Thus rotating shaft 13 so as to bring its full radius surface to bear against axial pin 17' will tip valve plug 17 away from valve seat 18, thereby opening the valve. It will be noted that the diameter of the plug 17 is only slightly less than the diameter of bore 3, so that releasing plug 17 by handle 50 will allow plug 17 to reshut on the valve seat substantially concentrically.

FIGS. 4 and 5 depict a different embodiment of the valve body 2 of plug 17 and of shaft 13, the embodiment being the subject of the present invention. The valve body 2 is the same as in FIG. 2, except that the bore for receiving the operant shaft at 13 is located at the level of the valve seat and radially externally of the "O" ring seal 19, so that the operant shaft 13 laps an edge portion of the downstream face of the disc-shaped, non-perforated plug 17, the latter being devoid of any upstream projecting axial pin, such as pin 17' of FIG. 2. The operant shaft 13 of FIGS. 4 and 5 has its longitudinal axis generally tangent to plug 17. As in the previous embodiment, the shaft 13 is provided at one of its ends protruding from the valve body with a transverse handle 50 to rotate the shaft 13, this shaft 13 has "O" ring seals, such as seals 14, and also the shaft 13 is removably held in position by external "O" rings, such as "O" rings 15 of FIG. 2. The shaft 13 of FIGS. 4 and 5 has a central cam surface 20 disposed immediately under the downstream edge portion of the disc plug 17. Cam surface 20, as clearly shown in FIG. 5, is formed by a notch in shaft 13 and extends across said shaft and merges with the full radius surface of the shaft 13. In the position of the shaft shown in FIG. 5, wherein disc 17 is in valve-closing position, the cam surface 20 is generally parallel to and not higher than the downstream surface of disc 17 and laps the downstream edge portion of the disc 17. Rotation of the shaft through about 90 degrees in counterclockwise direction as seen in FIG. 5, by means of handle 50, will tip the plug 17 angularly off the valve seat to a maximum open position, in which the full radius surface of the shaft 13 will engage the downstream edge portion of the disc 17. Upon rotation of the shaft 13 to the position shown in FIG. 5, the disc plug 17 will be allowed to take its closed position under the liquid pressure acting on its upstream face.

I claim:

1. A shut-off valve comprising a tubular body adapted to be positioned generally vertically, and having an upper, larger diameter upstream bore defining an inlet and a lower, smaller diameter downstream bore co-axial with and communicating with said upstream bore and defining an outlet and an upwardly-facing flat, annular valve seat lying in a plane perpendicular to the longitudinal axis of said bores, said valve seat having a circular groove, co-axial with and radially outwardly spaced from said downstream bore, said seat defining a deformable lip between said groove and said downstream bore, an "O" ring seal positioned and mechanically retained by said lip in said groove, said "O" ring protruding from said seat, a non-perforated, disc-shaped valve plug, of a diameter intermdiate the diameters of said upstream and downstream bores, entirely located within said upstream bore freely supported on said "O" ring and movable between a valve-opening and a valve-closing position, said valve plug having a downstream face facing said valve seat, and making sealing contact with said "O" ring in the valve-closing position of said valve plug, an operant cylindrical shaft removably extending transversely of said valve body and having a central portion exposed within said upstream bore, said shaft lying in a plane parallel to the plane of said valve seat radially outwardly of said "O" ring and with its longitudinal axis generally tangent to said valve plug, said shaft having an end projecting from said tubular valve body, a transverse handle fixed to said end to rotate said shaft, means to releasably retain said shaft in said valve body, sealing means between said shaft and said valve body at both ends of said central portion of said shaft, said central portion being notched and defining a cam surface extending across said shaft and merging with the full radius surface of said shaft, said cam surface lying in a plane generally parallel to and not higher than the downstream face of said valve plug in the valve-closing position of said valve plug, said cam surface and said full radius shaft surface selectively slidably contacting an edge portion of the downstream face of said valve plug upon rotational movement of said shaft in said valve body to permit said valve plug to take its valve-closing position under liquid pressure and to tilt said valve body on its valve seat to valve-opening position, respectively.

* * * * *